US012778348B2

(12) United States Patent
Fischer

(10) Patent No.: US 12,778,348 B2
(45) Date of Patent: Nov. 3, 2026

(54) USER RECORDED RECIPE FOR MIXER USING LOAD CELLS

(71) Applicant: Haier US Appliance Solutions, Inc., Wilmington, DE (US)

(72) Inventor: Austin Robert Fischer, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 589 days.

(21) Appl. No.: 18/359,452

(22) Filed: Jul. 26, 2023

(65) Prior Publication Data

US 2025/0031907 A1 Jan. 30, 2025

(51) Int. Cl.

*A47J 43/00* (2006.01)
*A47J 43/044* (2006.01)
*A47J 43/07* (2006.01)

(52) U.S. Cl.

CPC ......... *A47J 43/0705* (2013.01); *A47J 43/044* (2013.01); *A47J 2043/04454* (2013.01); *A47J 2043/0733* (2013.01)

(58) Field of Classification Search

CPC .................. A47J 43/0705; A47J 43/044; A47J 2043/04454

See application file for complete search history.

(56) References Cited

U.S. PATENT DOCUMENTS

| | | | | |
|---|---|---|---|---|
| 10,620,035 | B2 | 4/2020 | Finnance et al. | |
| 10,931,765 | B2 | 2/2021 | Ciepiel | |
| 11,061,419 | B1 | 7/2021 | Wallace et al. | |
| 2019/0239693 | A1 * | 8/2019 | Thomas ................ | A47J 43/044 |
| 2020/0000276 | A1 * | 1/2020 | Kemker ................ | G06F 16/252 |

OTHER PUBLICATIONS

BSH Home Appliances Ltd, “The OptiMUM kitchen machine”, BOSCH Invented for life, Retrieved from Internet: https://www.bosch-home.com/ne/specials/optimum-kitchen-machines.

* cited by examiner

*Primary Examiner* — Anshu Bhatia

(74) *Attorney, Agent, or Firm* — Dority & Manning, P.A.

(57) ABSTRACT

A stand mixer appliance includes a weighing system, an external communication system, and a controller in operative communication with the external communication system. The controller is configured to receive a first user input corresponding to a first recipe ingredient, obtain a weight of the first recipe ingredient using the weighing system, and save a user recorded recipe including the first recipe ingredient and the weight of the first recipe ingredient.

20 Claims, 3 Drawing Sheets

USER RECORDED RECIPE FOR MIXER USING LOAD CELLS

FIELD OF THE INVENTION

The present disclosure relates generally to stand mixers, more particularly to smart stand mixers with a load cell.

BACKGROUND OF THE INVENTION

Stand mixers are generally used for performing automated mixing, churning, or kneading involved in food preparation. Typically, stand mixers include a stand upon which a bowl is placed and a mixing device that rotates within the bowl. Food ingredients may be placed within the bowl to be mixed under the influence of the mixing device and a typically removable mixing utensil included in the mixing device.

Typically, a user follows directions, for example a recipe, for the addition of the food ingredients into the bowl in the proper amount. In many cases, each food ingredient is separately weighed on a scale and then presented to the bowl for mixing, often requiring separate weighing device and individual weighing vessels for each ingredient. The device and vessels must be cleaned after use and stored between uses.

Accordingly, a stand mixer that does not require a separate weighing device and weighing vessels may be desirable.

BRIEF DESCRIPTION OF THE INVENTION

Aspects and advantages of the invention will be set forth in part in the following description, may be apparent from the description, or may be learned through practice of the invention.

In one exemplary aspect, a stand mixer comprising a base, a receptacle, and a weighing system operably coupled to the base is presented. An external communication system in operative communication with an external device and a controller in operative communication with the external device through the external communication system is also provided. The controller is configured to receive a first user input corresponding to a first recipe ingredient; obtain a weight of the first recipe ingredient using the weighing system; set the weight of the first recipe ingredient as a first target weight; and save a user recorded recipe including the first recipe ingredient and the first target weight of the first recipe ingredient.

In another example aspect, a method of operating a stand mixer comprising a base operably coupled to a weighing system, a receptacle, an external communication system in operative communication with an external device and a controller is presented. The method comprises initiating a recipe feature, receiving a first user input corresponding to a first recipe ingredient, obtaining a weight of the first recipe ingredient in the receptacle using the weighing system, setting the weight of the first recipe ingredient as first target weight; receiving a second user input corresponding to a second recipe ingredient, obtaining a weight of the second recipe ingredient in the receptacle using the weighing system, setting the weight of the second recipe ingredient as a second target weight, receiving a user action input corresponding to a recipe instruction, and saving a user recorded recipe including the first recipe ingredient, the first target weight of the first recipe ingredient, the second recipe ingredient, the second target weight of the second recipe ingredient, and the recipe instruction in the user recorded recipe at a memory location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
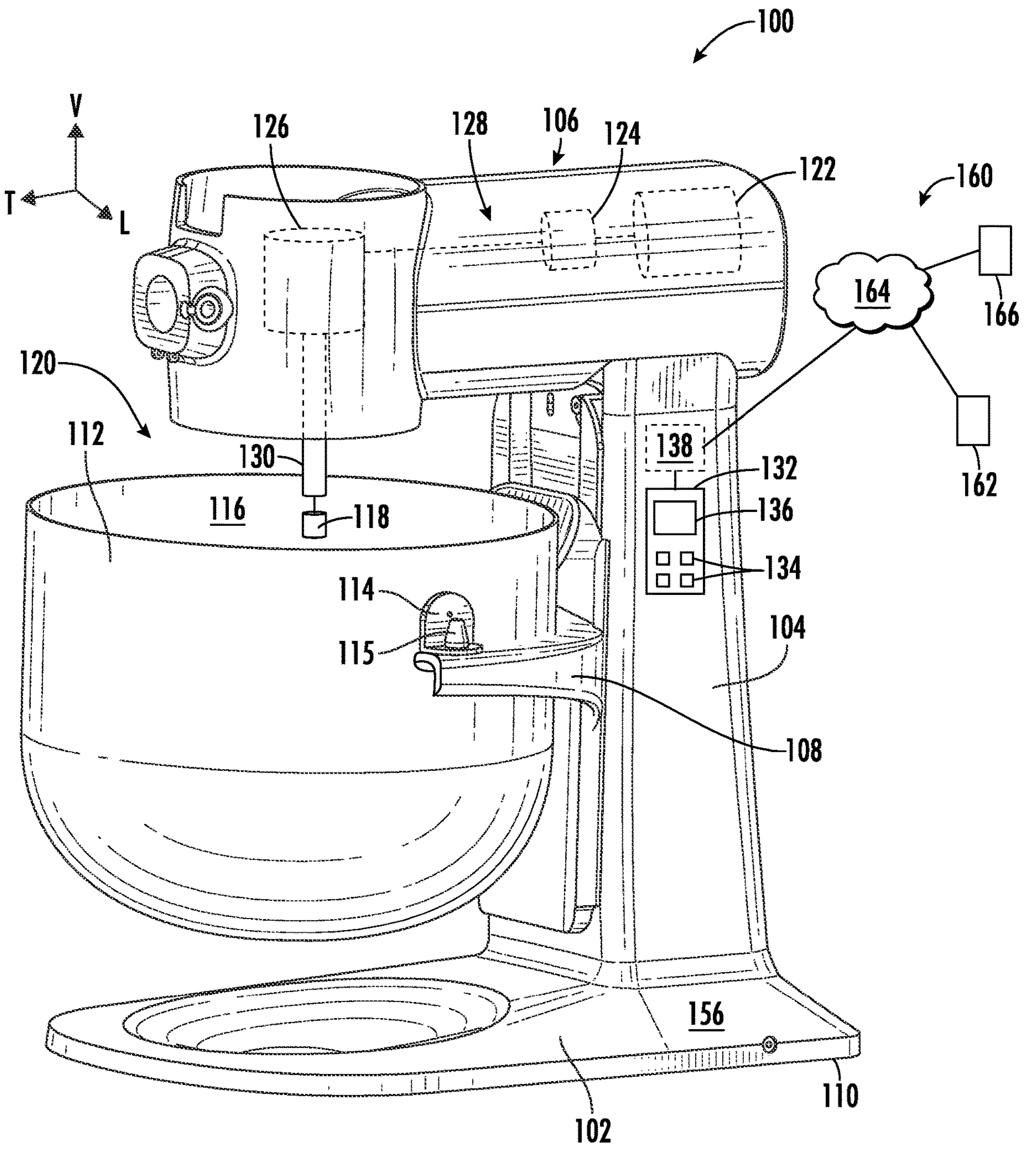
FIG. 1 provides an isometric view of a stand mixer in accordance with an embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides an isometric view of a stand mixer 100 according to an exemplary embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V, a lateral direction L, and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a base 102 and a support column 104. Column 104 may support a mixer head 106, which is positioned atop column 104. For example, as shown in FIG. 1, head 106 may be mounted to column 104, which is mounted to base 102. Thus, column 104 may extend between and connect base 102 and head 106, e.g., along the vertical direction V. Head 106 may extend outwardly above the base 102, in the transverse direction T and be suspended over mixing zone 120. Base 102 includes a downwardly facing bottom surface 158 vertically below the base 102 top surface 156. Bottom surface 158 is generally planar in the T-L plane and may be coterminous with the peripheral edge 110 of the base 102. In some embodiments, the bottom surface 158 may comprise a series of coplanar surfaces, for example formed by a series of ribs extending vertically downward from the base top surface 156, together forming a generally planar bottom surface 158.

As illustrated, the base 102, column 104, and head 106 may be separate components fixed together, for example with threaded fasteners (not shown), into a unit. In other embodiments, two or more of the base 102, column 104, and head 106, or parts thereof may be formed together. For example, in an embodiment, the base 102 and column 104 may be formed as one piece and further assembled to head 106. In another embodiment, the stand mixer 100 may be divided along the V-T plane into two pieces, for example a left piece and a right piece, that may be joined to form at least a portion of the stand mixer 100.

Column 104 may also include a bowl support 108. Components of bowl support 108 may extend outwardly above the base 102, e.g., in the transverse direction T, and may hold a receptacle or bowl 112 in the mixing zone 120 above base 102 along the vertical direction V. Bowl 112 may be removably mounted on bowl support 108 via flanges 114. Flanges 114 may be on opposite sides of the bowl 112 with respect to the circumference of the bowl. Posts 115 may be formed on the bowl support 108 to engage flanges 114 to secure the bowl 112 in the bowl support 108, for example against rotation about the vertical V axis.

Head 106 may house a motor 122, a planetary gearbox 124, and a bevel gearbox 126, comprising the drivetrain 128 of stand mixer 100. Drivetrain 128 may be provided within head 106 and configured for coupling motor 122 to a mixer shaft 130, such that shaft 130 is rotatable via motor 108 through drivetrain 128. Mixer shaft 130 may be positioned above mixing zone 120 and extend into interior portion 116 of bowl 112. A utensil 118, such as a beater, whisk, hook, or other food engaging utensil may be removably mounted to mixer shaft 130. Utensil 118 may rotate within a bowl 112 in mixing zone 120 to beat, whisk, knead, etc. material within the interior portion 116 of bowl 112 during operation of motor 122. The mixer shaft 130 may be releasably attached to utensil 118 via an attachment mechanism (not shown). A portion of the attachment mechanism may be included on the mixer shaft 130 with a cooperating portion included on the utensil 118.

As noted above, motor 122 may be operable to rotate mixer shaft 130. Motor 122 may be a direct current (DC) motor in certain example embodiments. In alternative example embodiments, motor 122 may be an alternating current (AC) motor. Motor 122 may include a rotor and a stator. The stator may be mounted within head 106 such that the stator is fixed relative to head 106, and the rotor may be coupled to mixer shaft 130 via drivetrain 128. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 128 may be configured (i.e., include a planetary gearbox 124) to provide a rotational speed reduction and mechanical advantage between motor 122 and mixer shaft 130.

Stand mixer 100 may include a control panel 132 that may represent a general-purpose Input/Output (“GPIO”) device or functional block for stand mixer 100. In some embodiments, control panel 132 may include or be in operative communication with one or more user input devices 134, such as one or more of a variety of digital, analog, electrical, mechanical, or electro-mechanical input devices including rotary dials, control knobs, push buttons, toggle switches, selector switches, and touch pads. Additionally, stand mixer 100 may include a display 136, such as a digital or analog display device generally configured to provide visual feedback regarding the operation of stand mixer 100. For example, display 136 may be provided on control panel 132 and may include one or more status lights, screens, or visible indicators. According to exemplary embodiments, user input devices 134 and display 136 may be integrated into a single device, e.g., including one or more of a touchscreen interface, a capacitive touch panel, a liquid crystal display (LCD), a plasma display panel (PDP), a cathode ray tube (CRT) display, or other informational or interactive displays. Control panel 132 is illustrated as included on column 104 in the exemplary embodiment of FIG. 1. In other embodiments, the control panel 132 may be mounted elsewhere on the head 106, column 104 or base 102 of stand mixer 100.

Stand mixer 100 may further include or be in operative communication with a processing device or a controller 138 that may be generally configured to facilitate appliance operation. In this regard, control panel 132, user input devices 134, and display 136 may be in communication with controller 138 such that controller 138 may receive control inputs from user input devices 134, may display information using display 136, and may otherwise regulate one or more operations of stand mixer 100. For example, signals generated by controller 138 may operate stand mixer 100, including any or all system components, subsystems, or interconnected devices, in response to the position of user input devices 134 and other control commands. Control panel 132 and other components of appliance 100 may be in communication with controller 138 via, for example, one or more signal lines or shared communication busses. In this manner, Input/Output ("I/O") signals may be routed between controller 138 and various operational components of stand mixer 100.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 138 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 138 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Referring still to FIG. 1, a schematic diagram of an external communication system 160 will be described according to an exemplary embodiment of the present subject matter. In general, external communication system 160 is configured for permitting interaction, data transfer, and other communications between stand mixer 100 and one or more external devices. For example, this communication may be used to provide and receive operating parameters, user instructions or notifications, performance characteristics, user preferences, or any other suitable information for improved performance of stand mixer 100. In addition, it should be appreciated that external communication system 160 may be used to transfer data or other information to improve performance of one or more external devices or appliances and/or improve user interaction with such devices.

For example, external communication system 160 permits controller 138 of stand mixer 100 to communicate with a separate device external to stand mixer 100, referred to generally herein as an external device 162. As described in more detail below, these communications may be facilitated using a wired or wireless connection, such as via a network 164. In general, external device 162 may be any suitable device separate from stand mixer 100 that is configured to provide and/or receive communications, information, data, or commands from a user. In this regard, external device 162 may be, for example, a personal phone, a smartphone, a tablet, a laptop or personal computer, a wearable device, a smart home system, or another mobile or remote device.

In addition, a remote server 166 may be in communication with stand mixer 100 and/or external device 162 through network 164. In this regard, for example, remote server 166 may be a cloud-based server 166, and is thus located at a distant location, such as in a separate state, country, etc. According to an exemplary embodiment, external device 162 may communicate with a remote server 166 over network 164, such as the Internet, to transmit/receive data or information, provide user inputs, receive user notifications or instructions, interact with or control stand mixer 100, etc. Network 164 and remote server 166 may process or store information communicated by external device 162. In addition, external device 162 and remote server 166 may communicate with stand mixer 100 to communicate similar information. For example, information communicated from the external device 162 or remote server 166 may be displayed on display 136 of control panel 132, or stored or processed by controller 138.

In general, communication between stand mixer 100, external device 162, remote server 166, and/or other user devices or appliances may be carried using any type of wired or wireless connection and using any suitable type of communication network, non-limiting examples of which are provided below. For example, external device 162 may be in direct or indirect communication with stand mixer 100 through any suitable wired or wireless communication connections or interfaces, such as network 164. For example, network 164 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP. SMTP, FTP), encodings or formats (e.g., HTML, XML), and/or protection schemes (e.g., VPN, secure HTTP, SSL).

External communication system 160 is described herein according to an exemplary embodiment of the present subject matter. However, it should be appreciated that the exemplary functions and configurations of external communication system 160 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 2:
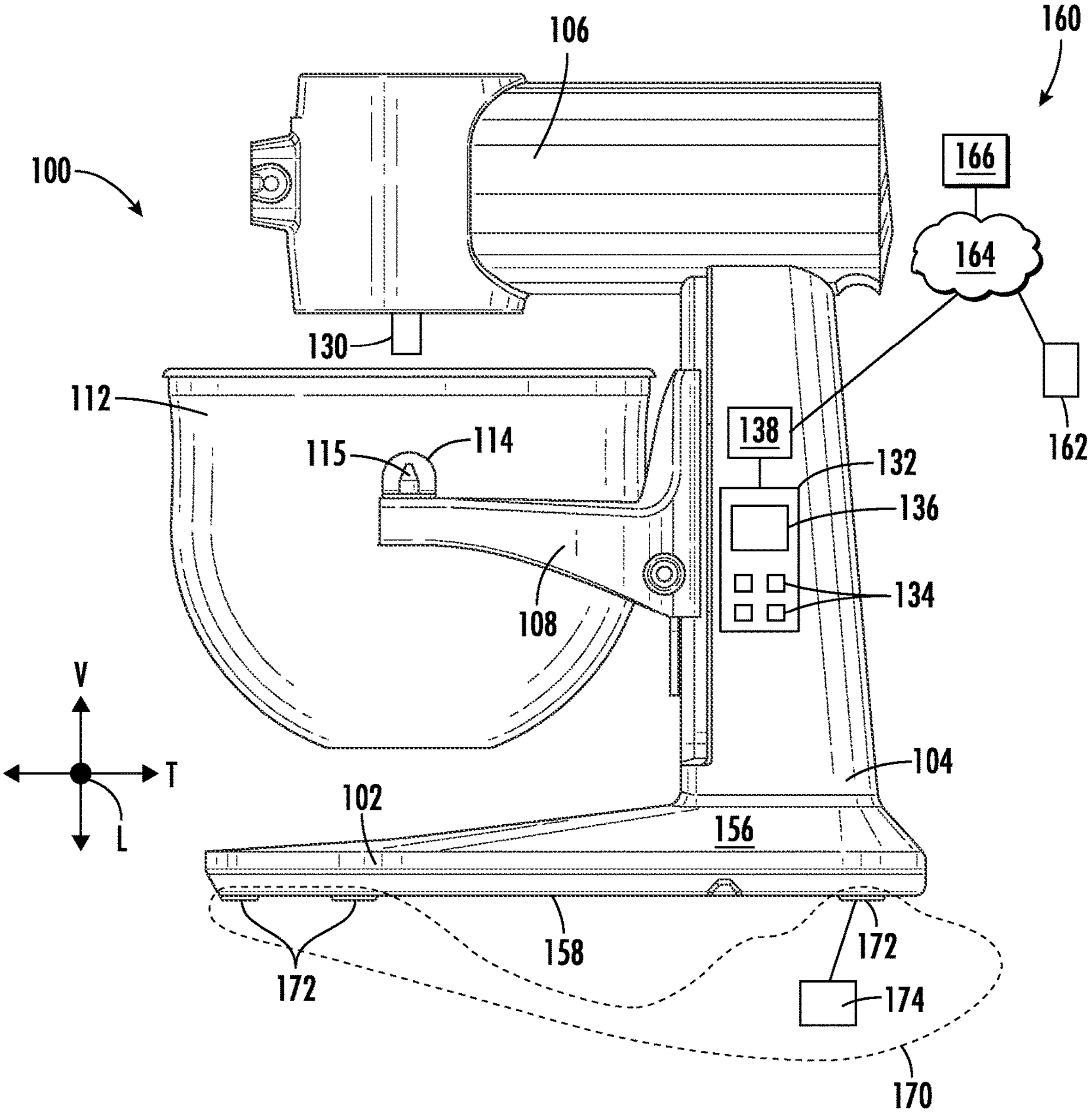
FIG. 2 is a side view of the stand mixer of FIG. 1.

As illustrated in FIG. 2, stand mixer 100 includes a weighing system 170 including one or more load sensors 172 (three shown) affixed to the bottom surface 158 of the base 102 and necessary power supply, controllers, and associated circuitry 174. Load sensors 172 may be any force transducer suitable to convert the weight of the stand mixer with any attached utensil 118 and any contents in the bowl 112 to a measurable electrical output signal proportional to the load, here the weight, applied. Load sensor 172 may be a load cell, for example a strain gauge load cell, although other types of load cells or load sensors may be used. For example, a stand mixer 100 prepared for use would include the stand mixer 100, bowl 112, and a utensil 118. The weighing system 170 is configured to convert the load (weight) sensed at the sensor 170 to an electrical signal that is proportional to the weight of the stand mixer 100 and utensil 118. Upon adding a recipe ingredient to the receptacle or bowl 112, the weight sensed by the load sensor 172 is increased by the weight of the added recipe ingredient. The electrical signal output of the weighing system 170 is change proportionally to correspond to the weight of the stand mixer 100, bowl, 112, utensil 118, and the recipe ingredient added to the bowl 112.

The weighing system 170 may be in operative communication with one or both of the controller 138 and the external communication system 160 through a wired or wireless connection. The weighing system 170 communicates a signal corresponding to the sensed weight to the controller 138 or external communication system 160. A processor or algorithm within the controller 138 or external communication system 160 is configured to receive the signal form the weighing system 170 and convert the signal to the weight sensed. The weight sensed may be displayed at the control panel 132, for example at the display 136, or at the external device 162. The weight sensed may also be saved in a memory location for processing. The memory location may be in the controller 138, the network 164, the external device 162, or the remote server 166.

Upon a first use of the stand mixer 100 with a user recorded recipe, the user initiates a recipe feature at one of the control panel 132 or the external device 162. In particular, an aspect of the recipe feature allowing a user to enter a recipe with recipe ingredients and recipe instructions is called. The controller receives a first user input corresponding to the first recipe ingredient from the external device 162 or the user inputs 134 of control panel 132. The first user input may be the name of the first ingredient and may be selected by the user from a list, for example a pull-down list, of ingredients preset in the controller 138 or accessible through the external device 162. In other embodiments, the user may enter the name of the ingredient using the user input 134 or external device 162. The selected or entered first ingredient may appear on the display 136 or on the external device 162 for user confirmation, which may comprise manipulating a user input 134 or a confirming action at the external device 162.

After entering the ingredient name, the controller 138 may be configured to obtain a weight of the first ingredient form the weighing system 170 of the stand mixer 100. In some embodiments, a tare function may be provided, and enacted at the control panel 132 or the external device 162, to set the weighing system to a display of zero. Thus, the weighing system 170 is configured to indicate the weight of the ingredient only, and not include the weight of the stand mixer 100.

The weighing system 170 may support the stand mixer 100 in its entirety, and therefore any addition anywhere on the stand mixer may be measured by the weighing system 170. For instance, an ingredient may be weighed by placing the ingredient on the base 102 or head 106 of the stand mixer 100. In some embodiments, the ingredient may be added to the receptacle or bowl 112. The weighing system 170 provides the controller 138 with a signal proportional to the weight of the added ingredient and the controller may display the weight on the display 136 or the external device 162.

Upon the addition of the desired amount by weight of the first recipe ingredient, the controller sets the first recipe ingredient name and weight in a memory location as the first recipe ingredient target weight, or first target weight. In some embodiments, the controller is configured to receive recipe instructions, for example instruction for the stand mixer 100 to perform a mixing operation on the first recipe ingredient. The mixing operation may include mixing, kneading, stirring, whipping, or other appropriate instructions for a stand mixer.

The controller 138 may be configured accept a user action to be carried out on one of the control panel 132 or the external device 162. User actions may include enacting the tare function after the addition of the first recipe ingredient or after the first recipe instruction. In other embodiments, the user action may be to change the utensil 118, remove the recipe ingredient from the bowl 112, or the like.

In embodiments, the stand mixer 100 is configured to accept the same or similar input for a second recipe ingredient including receive a second user input corresponding to a second recipe ingredient, obtain a weight of the second recipe ingredient using the weighing system, set a second target weight, receive a second user action input for a second recipe instruction, and save the second recipe ingredient name and quantity by weight to the memory location corresponding to the user recorded recipe.

Figure 3:
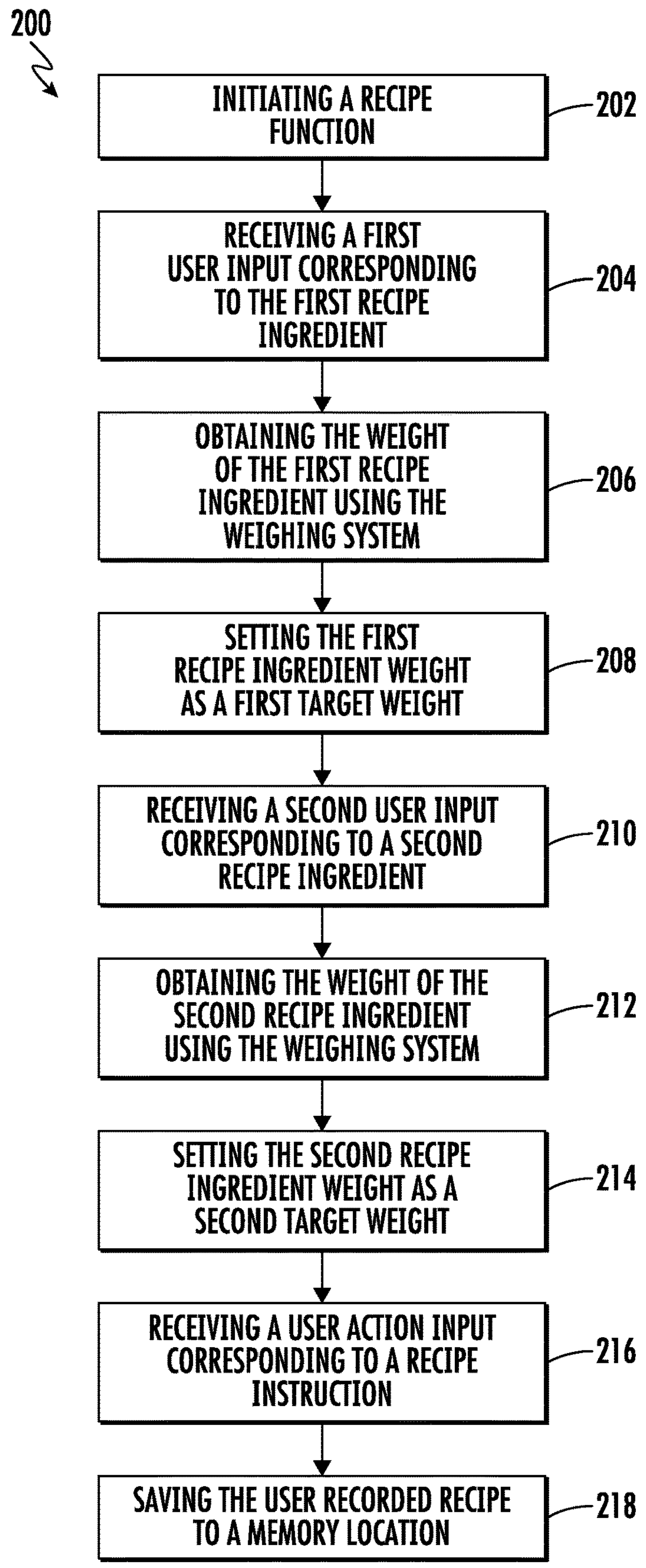
FIG. 3 illustrates a method for operating a stand mixer in accordance with an embodiment of the present disclosure.

Now that the construction of a stand mixer in accordance with this disclosure has been presented, an exemplary method of operation 200 will be described with reference to FIG. 3. Method 200 begins at 202 with the initiation of a recipe function. The recipe function may be stored at the controller 138 or in the external communication system 160 for access through one or both of the control panel 132 and the external device 162. Initiating the recipe function may include providing an identifier, e.g., a name, for the user recipe to be recorded. The user recorded recipe name may be saved to a memory location in the controller 138, the external communication system 160 or in the external device 162, or in more than one location.

At 204, the method receives a first user input that corresponds with the first recipe ingredient. In embodiments, the first user input is the name of the first recipe ingredient which may be selected from a predetermined list of ingredients, or the name may be entered by the user. The first user input may be made through the control panel 132, through manipulations of the user inputs 134, or may be made through the external device, for example using a provided keyboard at the external device 162.

At 206, the controller obtains a weight of the first recipe ingredient using the weighing system 170. The ingredient may be added to the receptacle 112 and weighed. In other embodiments, the ingredient may be placed on a portion of the stand mixer 100 and weighed.

The controller 138 sets the weight of the first recipe ingredient as a first target weight at step 208. The first recipe ingredient and the associated first target weight may be saved to the memory location associated with the user recorded recipe name.

At 210, the controller 138 is configured for receiving a second user input corresponding to a second recipe ingredient. As above with the first recipe ingredient, the second recipe ingredient may be selected form a predetermined list of ingredients or may be entered by the user using one of the user inputs 134 or the external device 162.

Advancing to 212, the method receives a weight of the second recipe ingredient using the weighing system. In embodiments, the second ingredient is added to the receptacle or bowl 112 with the first ingredient and the total weight is recorded. In some embodiments, controller 138 may execute a series of steps or instructions to subtract the weight of the first recipe ingredient from the total weight, yielding the weight of the second recipe ingredient. In other embodiments, the weighing system 170 tares the displayed weight to zero prior to the addition of the second recipe ingredient. For example, upon receiving the second user input, the weighing system 170 may tare the displayed weight to zero. Accordingly, the displayed weight, at the display 136 or the external device 162, will be the weight of the second recipe ingredient.

At 214, the weight of the second recipe ingredient is set as a second target weight. The second recipe ingredient and the associated second target weight may be saved to the memory location associated with the user recorded recipe name.

At 216, a user action input is received by the controller 138 corresponding to a recipe instruction. The recipe instruction may be a mixing action initiated by the stand mixer 100 to mix, knead, stir, whip, or similarly process the contents of the bowl 112. Processing the contents of the bowl may require changing the utensil 118, changing various settings on the stand mixer for mixing action parameters or duration.

At 218, the method saves the user recorded recipe to the location corresponding to the user recorded recipe name. The saved user recorded recipe includes at least the first recipe ingredient and associated first target weight, the second recipe ingredient and the associated second target weight, and the recipe instructions. A user may recall a user recorded recipe from the memory location at a point in the future for use in the stand mixer. To recall the recipe, the user may initiate a recipe recall feature through the user inputs 134 or through the external device 162. For example, when called, the recipe recall feature may search memory locations at the controller 138 or the external communication system 160, specifically the external device 162 which may have an application (or "app") specified for user recorded recipes. The search may apply various search filters or search criteria, and return results fulfilling or satisfying those criteria. The display 136 at the controller or the external device 162 may display a selection of identified user recorded recipes to choose from, giving the user the opportunity to select a desired recorded recipe. The recalled recipe may present the recipe ingredients to the user at the display 136 or the external device 162 in the order they were recorded and with the target weight for each ingredient.

With each recipe ingredient, the user may be prompted to add the recorded target weight to the receptacle or bowl 112. When the target weight is reached, the user may be prompted or alerted that the target weight has been reached. In some embodiments, the user may be prompted to tare the weight before the next addition of an ingredient. In other embodiments, the weighing system 170 retains a running total weight and subtracts the previous weight from the weight after an addition, yielding the weight of the last addition. In both cases, the controller may display on one of the display 136 and the external device 162 the weight of the last addition.

At the end of each addition, the controller recalls from the memory location any recorded recipe instructions to be performed on the recipe ingredients. In some embodiments, the user is prompted to perform the recipe instructions which may include operating features of the stand mixer 100, for example through manipulations of the user inputs 134. In other embodiments, the controller 138 may instruct the stand mixer 100 to initiate the features.

For example, the recalled user recorded recipe may specify the addition of a weighed amount of a first ingredient, followed by a recipe instruction, for example to stir the first recipe ingredient for a saved period of time. At the end of the prescribed period of stirring, the user may be prompted to add a saved weight of a second recipe ingredient. Following the second addition, the recalled recipe may prompt the user to mix the first and second recipe ingredients for a specific recorded time under specified mixing parameters.

The recalled instructions from the user recorded recipe may be displayed in the order they were saved until the last recipe ingredient is added and the last recipe instruction is completed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A stand mixer appliance comprising:

a base;

a receptacle;

a weighing system operably coupled to the base;

an external communication system in operative communication with an external device; and a controller in operative communication with the external device through the external communication system, the controller being configured to:

receive a first user input corresponding to a first recipe ingredient;

obtain a weight of the first recipe ingredient using the weighing system;

set the weight of the first recipe ingredient as a first target weight;

save a user recorded recipe including the first recipe ingredient and the first target weight of the first recipe ingredient, receive a second user input corresponding to a second recipe ingredient;

obtain a weight of the second recipe ingredient using the weighing system;

set the weight of the second recipe ingredient as a second target weight;

receive a second user action input corresponding to a second recipe instruction; and save the second recipe ingredient, the second target weight of the second recipe ingredient, and the recipe instruction in the user recorded recipe, wherein the stand mixer further comprising a control panel in operative communication with the controller, the control panel including one or more user inputs and a display, wherein the controller receives at least one of the first user input and the second user input from one of the external device and the control panel, and wherein the user input controls include a tare function.

2. The stand mixer of claim 1, wherein the controller receives the first user input from the external device.

3. The stand mixer of claim 2, wherein the recipe instruction comprises a mixing instruction.

4. The stand mixer of claim 1, wherein the controller receives the first user input from the external device.

5. The stand mixer of claim 4, wherein the recipe instruction comprises a mixing instruction.

6. The stand mixer of claim 1, wherein the controller is further configured to receive a first user action input corresponding to a first recipe instruction.

7. The stand mixer of claim 1, wherein the controller is further configured to:

receive a request to implement the user recorded recipe;

prompt a user to add the first recipe ingredient;

monitor a weight of the first recipe ingredient using the weighing system;

notify the user when the weight has reached the first target weight; and prompt the user to initiate the first recipe instruction.

8. The stand mixer of claim 1, wherein the controller is further configured to:

receive a request to implement the user recorded recipe;

prompt a user to add the first recipe ingredient;

monitor a weight of the first recipe ingredient using the weighing system;

notify the user when the weight of the first recipe ingredient has reached the first target weight;

prompt a user to add the second recipe ingredient;

monitor a weight of the second recipe ingredient using the weighing system;

notify the user when the weight of the second recipe ingredient has reached the second target weight; and prompt the user to initiate the second recipe instruction.

9. The stand mixer of claim 8, wherein the weighing system is selectively adjustable between a first weighing scheme and a second weighing scheme, wherein in the first weighing scheme, the weight of the recipe ingredient added is displayed on one of the control panel and the external device and the display is tared before a subsequent addition, and wherein in the second weighing scheme, the controller determines the weight of the recipe ingredient added by processing a total weight prior to the addition of the recipe ingredient and a total weight following the addition of the recipe ingredient.

10. The stand mixer of claim 1, wherein the user recorded recipe is saved in at least one of a network in the external communication system and the external device.

11. The stand mixer of claim 1, wherein the weighing system includes a tare function accessible through the external device.

12. A method of operating a stand mixer comprising a base operably coupled to a weighing system, a receptacle, an external communication system in operative communication with an external device, and a controller, the method comprising:

initiating a recipe feature;

receiving a first user input corresponding to a first recipe ingredient;

obtaining a weight of the first recipe ingredient in the receptacle using the weighing system;

setting the weight of the first recipe ingredient as first target weight;

receiving a second user input corresponding to a second recipe ingredient;

obtaining a weight of the second recipe ingredient in the receptacle using the weighing system;

setting the weight of the second recipe ingredient as a second target weight;

receiving a user action input corresponding to a recipe instruction; and saving a user recorded recipe including the first recipe ingredient, the first target weight of the first recipe ingredient, the second recipe ingredient, the second target weight of the second recipe ingredient, and the recipe instruction in the user recorded recipe at a memory location, wherein the recipe instruction includes processing the first recipe ingredient and the second recipe ingredient outside of the receptacle.

13. The method of claim 12, wherein initiating the recipe feature comprises receiving a user input at a user input control operatively coupled to the controller and user input at the external device.

14. The method of claim 12, wherein the memory location for saving the user recorded recipe comprises is in one or more of the external device or the external communication system.

15. The method of claim 14, wherein the memory location at the external communication system comprises one or more of a network and a remote server.

16. The method of claim 12, wherein the first user input comprises one of:

selecting a first recipe ingredient from a list of ingredients; and entering an ingredient name.

17. The method of claim 16, wherein the first user input is entered at one of the external device and a user input control operatively coupled to the controller.

18. The method of claim 12, wherein the recipe instruction includes prompting a user to initiate a mixing operation for the first recipe ingredient and the second recipe ingredient in the receptacle.

19. A stand mixer appliance comprising:

a base;

a receptacle;

a weighing system operably coupled to the base;

an external communication system in operative communication with an external device; and a controller in operative communication with the external device through the external communication system, the controller being configured to:

receive a first user input corresponding to a first recipe ingredient;

obtain a weight of the first recipe ingredient using the weighing system;

set the weight of the first recipe ingredient as a first target weight;

save a user recorded recipe including the first recipe ingredient and the first target weight of the first recipe ingredient, receive a second user input corresponding to a second recipe ingredient;

obtain a weight of the second recipe ingredient using the weighing system;

set the weight of the second recipe ingredient as a second target weight;

receive a second user action input corresponding to a second recipe instruction; and save the second recipe ingredient, the second target weight of the second recipe ingredient, and the recipe instruction in the user recorded recipe, receive a request to implement the user recorded recipe;

prompt a user to add the first recipe ingredient;

monitor a weight of the first recipe ingredient using the weighing system;

notify the user when the weight of the first recipe ingredient has reached the first target weight;

prompt a user to add the second recipe ingredient;

monitor a weight of the second recipe ingredient using the weighing system;

notify the user when the weight of the second recipe ingredient has reached the second target weight; and prompt the user to initiate the second recipe instruction, wherein the weighing system is selectively adjustable between a first weighing scheme and a second weighing scheme, wherein in the first weighing scheme, the weight of the recipe ingredient added is displayed on one of the control panel and the external device and the display is tared before a subsequent addition, and wherein in the second weighing scheme, the controller determines the weight of the recipe ingredient added by processing a total weight prior to the addition of the recipe ingredient and a total weight following the addition of the recipe ingredient.

20. The stand mixer of claim 19, wherein the controller is further configured to receive a first user action input corresponding to a first recipe instruction.

* * * * *